United States Patent
Bottreau et al.

(10) Patent No.: US 6,825,885 B2
(45) Date of Patent: Nov. 30, 2004

(54) MOTION INFORMATION CODING AND DECODING METHOD

(75) Inventors: Vincent Bottreau, Paris (FR); Beatrice Pesquet-Popescu, Fontenay-sous-Bois (FR)

(73) Assignee: Koninklijke Philips Electronics N.V., Eindhoven (NL)

(*) Notice: Subject to any disclaimer, the term of this patent is extended or adjusted under 35 U.S.C. 154(b) by 128 days.

(21) Appl. No.: 10/240,914

(22) PCT Filed: Feb. 11, 2002

(86) PCT No.: PCT/IB02/00777

§ 371 (c)(1),
(2), (4) Date: Sep. 25, 2002

(87) PCT Pub. No.: WO02/065784

PCT Pub. Date: Aug. 22, 2002

(65) Prior Publication Data

US 2003/0076883 A1 Apr. 24, 2003

(30) Foreign Application Priority Data

Feb. 13, 2001 (EP) ............................................. 01400375

(51) Int. Cl.[7] .......................... G03B 13/00; H04N 5/232
(52) U.S. Cl. .................................. 348/404.1; 348/405.1
(58) Field of Search .......................... 348/404.1, 405.1; 117/2, 3

(56) References Cited

U.S. PATENT DOCUMENTS 5,574,663 A    11/1996    Ozcelik et al. ............. 364/514

FOREIGN PATENT DOCUMENTS

| EP | 0415491 A1 | 8/1990 | ........... G06F/15/70 |
| WO | WO9746022 | 5/1997 | ............ H04N/7/36 |

OTHER PUBLICATIONS

"True motion estimation with 3D recursive block matching", by G. de Haan and al., IEEE Transactions on Circuits and Systems for Video Technology, vol. 3, No. 5, Oct. 1993, pp. 368–379.

*Primary Examiner*—Felisa Hiteshew

(57) ABSTRACT

The invention relates to a method of coding motion information associated to an image sequence, comprising the steps of subdividing each image into blocks and applying to each block a block-matching algorithm for defining a shifted block as the prediction of the current block, the motion vector between said shifted and current blocks being the predicted vector associated to said current block and all the motion vectors similarly predicted for a whole current image constituting a motion vector field associated to said current image. For each current image, the motion information constituted by said associated motion vector field is finally coded. According to the invention, the motion vector C to be coded is approximated by a spatio-temporal predictor P defined by a relation of the type: $P = \alpha \cdot S + \beta \cdot T$, where S and T are spatial and temporal predictors respectively, and ($\alpha$, $\beta$) are weighting coefficients respectively associated to said spatial and temporal predictors. The invention also relates to the corresponding decoding method.

7 Claims, 3 Drawing Sheets

MOTION INFORMATION CODING AND DECODING METHOD

FIELD OF THE INVENTION

The present invention relates to a method of coding motion information associated to a video sequence divided into successive frames, comprising the steps of:

subdividing the current frame into bidimensional blocks;

for each current block of said current frame, selecting in a previous frame, by means of a block-matching algorithm, a shifted block as the prediction of said current block, the motion vector between said shifted and current blocks being the predicted vector associated to said current block and all the motion vectors similarly predicted for a whole current frame constituting a motion vector field associated to said current frame;

for each current frame, coding by means of a differential encoding technique, including for each motion vector to be coded a predictor associated to it, the motion information constituted by said associated motion vector field.

The invention also relates to a corresponding encoding device, to a method of decoding motion information coded according to this coding method, and to a corresponding decoding device. In the detailed description of one implementation of the invention, that will be given later, the bidimensional blocks are for instance macroblocks, as defined in the standards of the MPEG family.

BACKGROUND OF THE INVENTION

The coding schemes proposed for digital video compression generally use motion estimation and compensation for reducing the temporal redundancy between the successives frames of the processed video sequence. In such methods, a set of motion vectors is determined at the encoding side and transmitted to the decoder. Most video coding standards use for the motion estimation operation the so-called block matching algorithm (BMA), described for example in the document "MPEG video coding: a basic tutorial introduction", S. R. Ely, BBC Research and Development Report, 1996. Said algorithm, depicted in FIG. 1, tries to find for each block $B_c$ of a current image $I_t$ the block $B_r$ of a previous reference image $I_{t-1}$, that best matches, said previous block being only searched in a limited area of this previous image (or search window SW) around the position of the bloc $B_c$. The set of motion vectors thus determined in the encoder for each block $B_c$ of the current frame must be sent to the decoder.

In order to minimize the bitrate needed to transmit the motion vectors, these vectors are generally differentially encoded with reference to previously determined motion vectors (or predictors). More precisely, the encoding of the motion vectors describing the motion from previous blocks $B_r$ to current ones $B_C$ is realized by means of a predictive technique based on previously transmitted spatial neighbours. The motion vectors are differenced with respect to a prediction value and coded using variable length codes.

SUMMARY OF THE INVENTION

It is a first object of the invention to propose a method for coding motion vectors that includes an improved prediction of these motion vectors.

To this end, the invention relates to a coding method such as defined in the introductory part of the description and which is moreover characterized in that, for each current block, the predictor used in the subtraction operation of said differential encoding technique is, a spatio-temporal predictor P obtained by means of a linear combination defined by a relation of the type:

$$P = \alpha \cdot S + \beta \cdot T$$

where S and T are spatial and temporal predictors respectively, and ($\alpha$, $\beta$) are weighting coefficients respectively associated to said spatial and temporal predictors.

In an advantageous implementation of the invention, the criterion for the choice of the weighting coefficients is to minimize the distortion between the motion vector C to be coded and its predictor P in the least means square sense, i.e. to minimize the following operator:

$$F = \Sigma [C - (\alpha \cdot S + \beta \cdot T)]^2,$$

where the summation is done on the entire motion vector field, i.e. for all the blocks of the current frame.

Preferably, the spatial predictor is obtained by applying a median filtering on a set of motion vector candidates chosen in the neighbourhood of the current block, said set of motion vector candidates comprising three motion vector candidates if a spatial prediction compliant with the MPEG-4 standard is required.

The temporal predictor may be determined either by re-using the spatial predictor already determined for the motion vector of the current block to point to the block inside the previously transmitted motion vector field, or by keeping in memory the spatial predictor candidates used during the computation of the spatial predictor, pointing with them from the corresponding blocks in the current image to blocks of the previous image whose motion vectors may be viewed also as spatial predictors for the temporal predictor to be determined, and implementing a median filtering of these spatial predictors inside the previous motion vector field, the obtained result being said temporal predictor to be determined.

It is another object of the invention to propose a method of decoding motion information coded by means of said coding method.

To this end, the invention relates to a method of decoding motion information corresponding to an image sequence and which has been previously, before a transmission and/or storage step, coded by means of a coding method comprising the steps of:

subdividing the current image into bidimensional blocks;

for each current block of the current image, selecting in a previous image, by means of a block-matching algorithm, a shifted block as the prediction of said current block, the motion vector between said shifted and current blocks being the predicted vector associated to said current block and all the motion vectors similarly predicted for a whole current image constituting a motion vector field associated to said current image;

for each current image, coding the motion information constituted by said associated motion vector field, the motion vector C to be coded for each current block being approximated by a spatio-temporal predictor P obtained by means of a linear combination defined by a relation of the type:

$$P = \alpha \cdot S + \beta \cdot T$$

where S and T are spatial and temporal predictors respectively, and ($\alpha$, $\beta$) are weighting coefficients respectively associated to said spatial and temporal predictors, said decoding method being characterized in that it comprises two types of decoding step:

for the first motion vector field of the sequence, a first type of decoding step only based on spatial predictors;

for the other motion vector fields, a second type of decoding step comprising a computation of the spatio-temporal predictor P on the basis of the motion vectors of the previous motion vector field already decoded, spatial predictors defined in the neighbourhood of the current motion vector to be decoded, and the transmitted weighting coefficients α and β.

BRIEF DESCRIPTION OF THE DRAWINGS

The present invention will now be described, by way of example, with reference to the accompanying drawings in which.

DETAILED DESCRIPTION OF THE INVENTION

Figure 1:
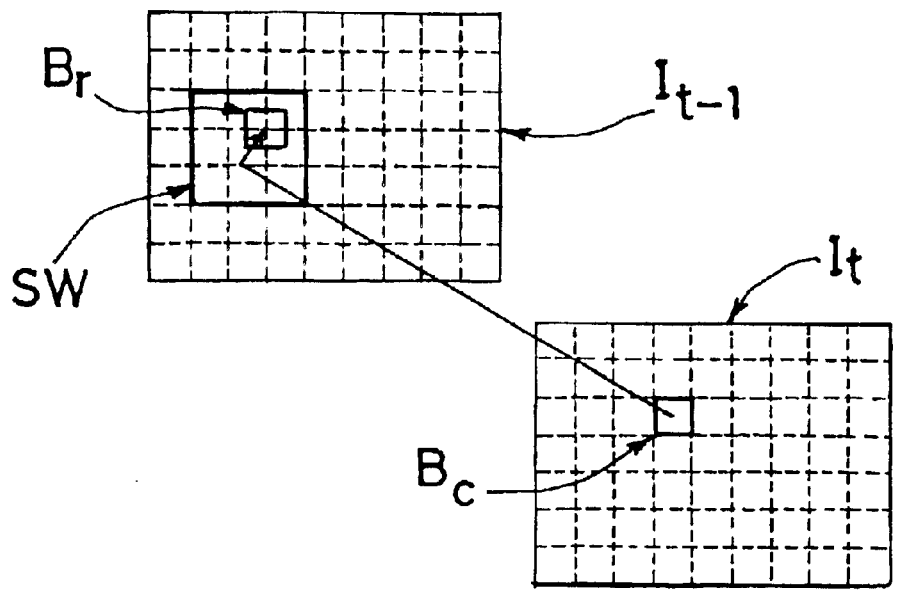
FIG. 1 illustrates the classical block matching algorithm.

As explained above with reference to FIG. 1, the motion estimation is based on a search scheme which tries to find the best matching position of a block within a limited search area SW in the previous frame, said matching position being described for each block (or "macroblock", in the case of the MPEG standards) by a motion vector which is, after subtraction of the predictor and variable length encoding (VLC), transmitted from the encoder to the decoder.

Figure 2:
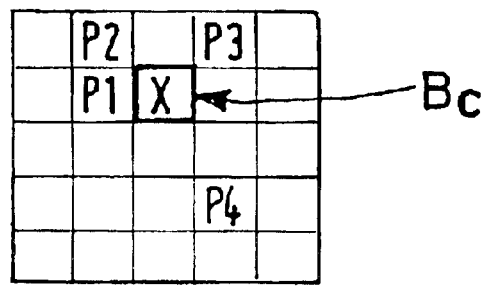
FIG. 2 shows the locations of the predictors used in a known three-dimensional (3D) motion estimation method.

The principle of the invention is to introduce in the prediction (provided before the variable length coding (VLC) of the differential values corresponding to each current motion vector) an additional operation taking into account the temporal correlation observed between two successive motion vector fields. A block-based motion estimation using temporal predictors is already described for instance in "True motion estimation with 3D recursive block matching", by G. de Haan and al., IEEE Transactions on Circuits and Systems for Video Technology, Vol.3, n°5, October 1993, pp.368–379. This technique, which is based on a 3-D recursive search, uses in one of its possible implementations, illustrated in FIG. 2, three spatial predictors P1, P2, P3 chosen among the neighbouring blocks of the current block $B_C$, one additional spatial predictor which is a linear combination of P1 and the best candidate of the block previously processed, and a temporal predictor P4 ("temporal" means that the corresponding motion vector belongs to the previous motion vector field).

Figure 3:
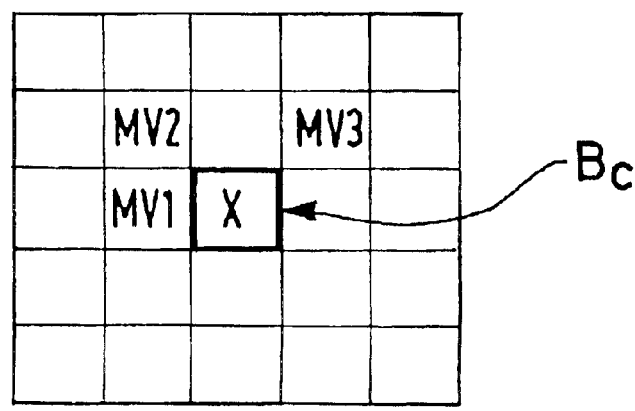
FIG. 3 shows the possible locations of spatial candidates for motion vector encoding by means of a predictive technique.

Usually, previous works only considered spatial predictors to differentially encode the current motion vector. In the case of 16×16 pixel motion vectors (one motion vector for a macroblock including four blocks), the spatial prediction consisted of choosing several motion candidates (three in the case of MPEG-4) in the neighbourhood of the current macroblock, as illustrated for instance in FIG. 3 showing possible locations of such candidates MV1, MV2 and MV3 (the spatial predictor for the current motion vector is then obtained by carrying out a median filtering operation on these motion vector candidates). For improving motion vector encoding, it is now proposed to exploit the correlation existing between motion vectors along the motion trajectory so as to better predict the motion vector of the current macroblock to be encoded.

Figure 4:
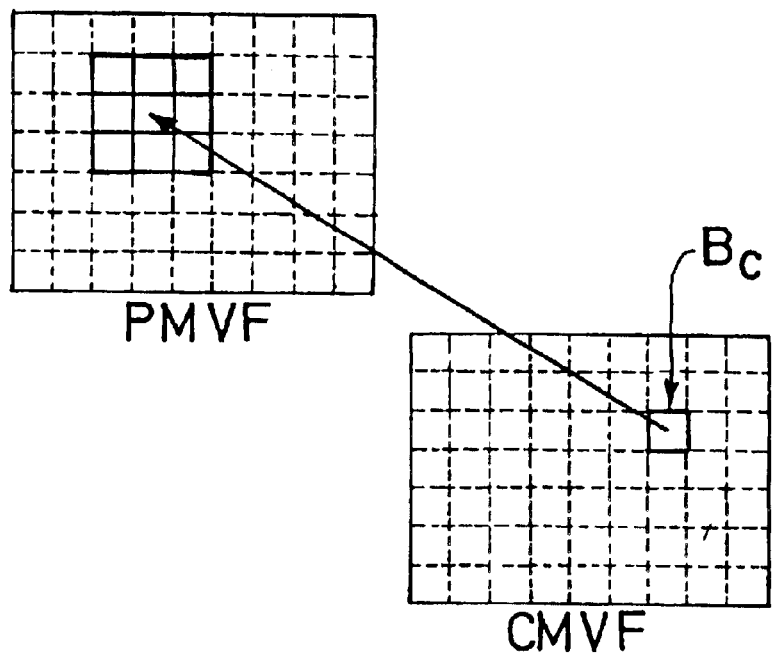
FIG. 4 illustrates a first solution for the determination of a motion vector temporal predictor.

As illustrated in FIG. 4, a first solution for determining, for the current motion vector field CMVF, an appropriate temporal predictor P may be to re-use the spatial predictor already determined for the motion vector of the current macroblock to point to the macroblock inside the previously transmitted motion vector field PMVF. Moreover, in order to reduce the impact of a bad quality prediction, a median filtering operation may be, once more, carried out on a neighbourhood of eight macroblocks around the selected macroblock.

Figure 5:
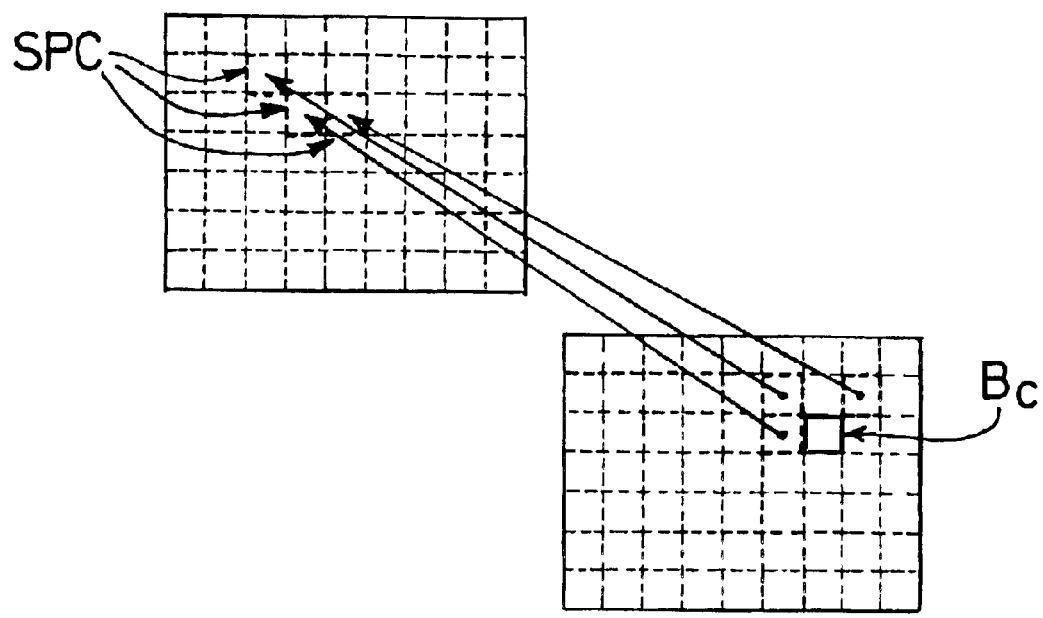
FIG. 5 illustrates a second solution for such a determination.

A second solution for the determination of the predictor P is, as illustrated in FIG. 5, to keep in memory the spatial predictor candidates SPC used during the computation of the spatial predictor. These motion vector candidates point from macroblocks in the current frame to macroblocks of the previous frame whose motion vectors may be viewed also as spatial predictors for the temporal predictor that has to be determined. This temporal predictor for the current motion vector is then the result of a median filtering of these spatial predictors inside the previous motion vector field.

Whatever the chosen solution, the predictor P, which may be called spatial-temporal, is obtained by means of a linear combination of the following type:

$$P = \alpha \cdot S + \beta \cdot T$$

where S and T are the additional spatial predictor and the temporal predictor respectively determined as described above and (α, β) are weighting coefficients respectively associated to said spatial and temporal predictors. A possible criterion for the choice of α and β is to minimize in the least means square sense the distortion between the original motion vector C and its predictor P, i.e. to minimize the operator F:

$$F = \Sigma[C - (\alpha \cdot S + \beta \cdot T)]^2,$$

the summation Σ being done on the entire motion vector field, i.e. by involving all the macroblocks of the current frame (these weighting coefficients α and β need to be transmitted towards the decoding side, since the decoding device cannot perform the symmetric operations to compute them: with respect to the global transmission cost, a good trade-off must therefore be reached between the transmission gain brought by the temporal predictor and the additional transmission cost of the two values (α, β) for each motion vector field).

The motion vectors are generally encoded with a DPCM (Differential Pulse Code Modulation) technique, in which only the differences between the input and a prediction based on a previous output locally decoded are quantized and transmitted, followed by an entropy coding step using VLC tables and generating the coded data corresponding to the motion vectors). When a coding method such as described above has been used within a video coding scheme, the coded data corresponding to the motion vectors and received at the decoding side must be specifically decoded. The motion vector reconstruction is then carried out according to the following processing steps:

- for the first motion vector field (i.e the one that does not have any predecessor), a classical decoding step, only based on spatial predictors, is implemented;
- for the other motion vector fields (i.e. the ones that have temporal predecessors), the operations provided in the encoder are similarly implemented: knowing the motion vector temporal predictors (which are the motion vectors of the previous motion vector field already decoded), the spatial predictors (=motion vectors in the neighbourhood of the current motion vector to be decoded) and the weighting coefficients α and β (that have been transmitted), the final predictor P=α·S+β·T, already used at the encoder side, is computed, which then allows to differently decode the current motion vector by means of the correspondence established in the VLC tables of the encoder.

Figure 6:
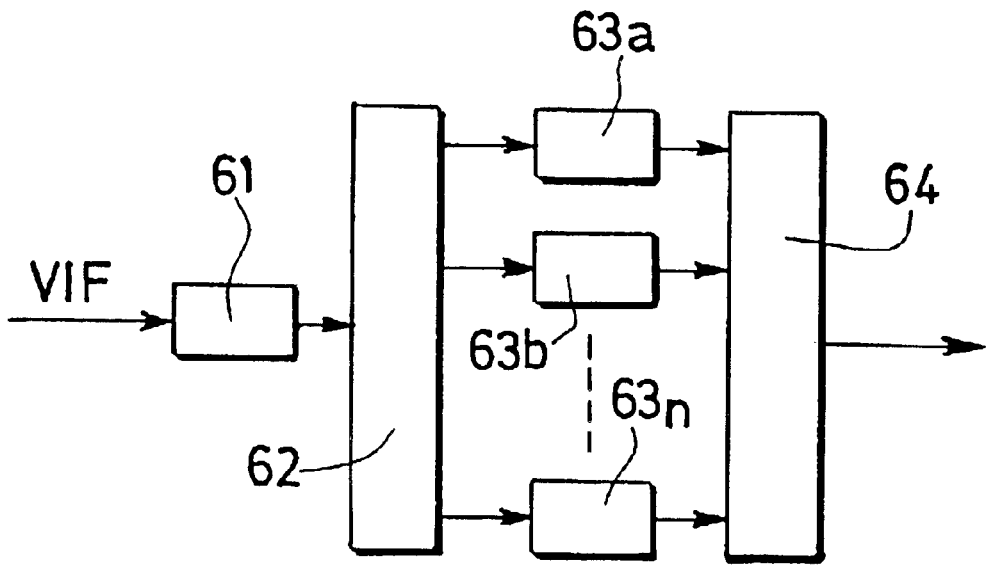
FIG. 6 illustrates an implementation of an encoder allowing to carry out the encoding method according to the invention.

The encoding technique described above may be carried out in many encoding schemes, for instance in an MPEG-4 video encoder. FIG. 6 gives a illustration of such an encoder: the input video information VIF is split into video objects (VOs) by means of a segmentation circuit 61, a coding control circuit 62 decides (for instance on the basis of requirements of the user, or of the capabilities of the decoder) which VOs are to be transmitted, the selected VOs are then encoded (each one independently of the others) in coding circuits 63a to 63n, and a multiplexer 64 merges the n bitstreams thus obtained (and representing the different VOs) into a single video bitstream. Each VO being defined by its shape, texture and motion components, the encoding mechanism of each coding circuit must perform shape, texture and motion encoding operations. The shape and texture operations are performed as described for instance in "MPEG-4 natural video coding—An overview", T. Ebrahimi and al., Signal Processing: Image Communication, vol. 15, n°4–5, January 2000, pp.365–385. The motion operation can be performed according to the invention, i.e. by implementing the motion information coding method described above.

Figure 7:
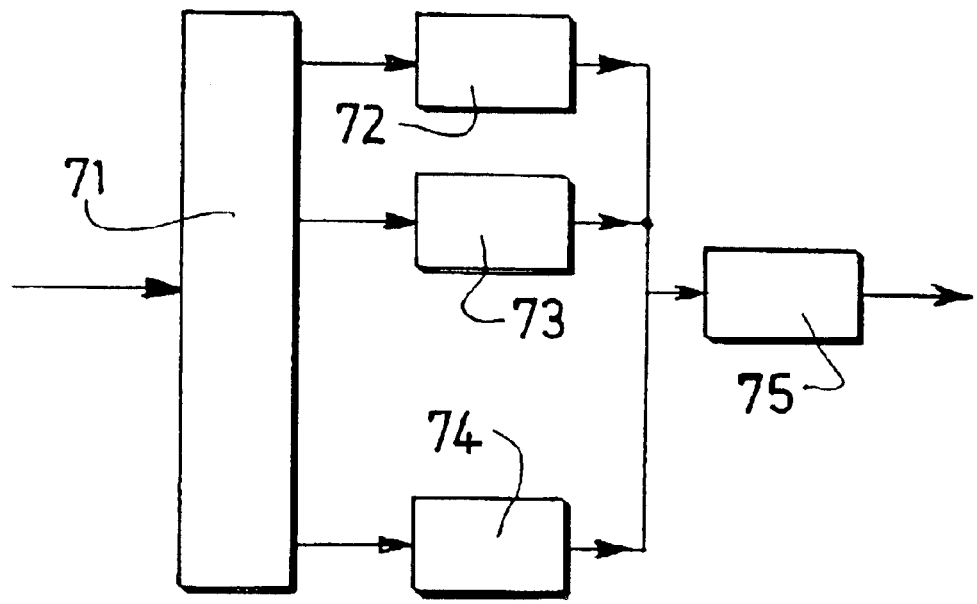
FIG. 7 illustrates an implementation of a decoder allowing to carry out the decoding method according to the invention.

Similarly, the decoding method described above and corresponding to the encoding method according to the invention may be carried out in a decoding scheme such as described in the same document. FIG. 7 gives an illustration of a decoder allowing to receive and decode a coded bitstream such as the one obtained when performing said encoding method: the input bitstream is first demultiplexed in a demultiplexing circuit 71, the demultiplexed elementary streams thus generated, corresponding to the different VOs, are parsed and passed to appropriate decoders (shape decoding circuit 72, texture decoding circuit 73, motion decoding circuit 74), and a reconstruction circuit 75, using the decoded data along with scene description information to re-compose the original scene including the VOs, allows to finally obtain a displayed video image. The motion information decoding method according to the invention is performed in said circuit 74.

The foregoing description of the preferred embodiments of the invention has been presented for purposes of illustration and description. It is not intended to be exhaustive or to limit the invention to the precise form disclosed, and obviously many modifications and variations, apparent to a person skilled in the art and intended to be included within the scope of this invention, are possible in light of the above teachings.

It may for example be understood that the devices described herein can be implemented in hardware, software, or a combination of hardware and software, without excluding that a single item of hardware or software can carry out several functions or that an assembly of items of hardware and software or both carry out a single function. The described methods and devices may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized.

The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following:

(a) conversion to another language, code or notation; and/or
(b) reproduction in a different material form.

What is claimed is:

1. A method of coding motion information associated to a video sequence divided into successive frames, comprising the steps of:
    subdividing the current frame into bidimensional blocks;
    for each current block of said current frame, selecting in a previous frame, by means of a block-matching algorithm, a shifted block as the prediction of said current block, the motion vector between said shifted and current blocks being the predicted vector associated to said current block and all the motion vectors similarly predicted for a whole current frame constituting a motion vector field associated to said current frame;
    for each current frame, coding by means of a differential encoding technique involving for each motion vector to be coded a predictor associated to it, the motion information constituted by said associated motion vector field;
said method being characterized in that, for each current block, the predictor used in the subtraction operation of said differential encoding technique is a spatio-temporal predictor P obtained by means of a linear combination defined by a relation of the type:

$$P = \alpha \cdot S + \beta \cdot T$$

where S and T are spatial and temporal predictors respectively, and (α, β) are weighting coefficients respectively associated to said spatial and temporal predictors.

2. A coding method according to claim 1, characterized in that the criterion for the choice of the weighting coefficients is to minimize the distortion between the motion vector C to be coded and its predictor P in the least means square sense, i.e. to minimize the following operator:

$$F = \Sigma [C - (\alpha \cdot S + \beta \cdot T)]^2,$$

where the summation is done on the entire motion vector field, i.e. for all the blocks of the current frame.

3. A coding method according to claim 2, characterized in that the spatial predictor is obtained by applying a median filtering on a set of motion vector candidates chosen in the neighbourhood of the current block.

4. A coding method according to claim 3, characterized in that the set of motion vector candidates comprises three motion vector candidates, in order to have a spatial prediction compliant with the MPEG-4 standard.

5. A coding method according to claim 2, characterized in that the temporal predictor is determined by re-using the spatial predictor already determined for the motion vector of the current block to point to the block inside the previously transmitted motion vector field.

6. A coding method according to claim 2, characterized in that the temporal predictor is determined by keeping in memory the spatial predictor candidates used during the computation of the spatial predictor, pointing with them from the corresponding blocks in the current image to blocks of the previous image whose motion vectors may be viewed also as spatial predictors for the temporal predictor to be determined, and implementing a median filtering of these spatial predictors inside the previous motion vector field, the obtained result being said temporal predictor to be determined.

7. A method of decoding motion information corresponding to an image sequence and which has been previously, before transmission and/or storage, coded by means of a coding method comprising the steps of:

subdividing the current image into bidimensional blocks;

for each current block of the current image, selecting in a previous image, by means of a block-matching algorithm, a shifted block as the prediction of said current block, the motion vector between said shifted and current blocks being the predicted vector associated to said current block and all the motion vectors similarly predicted for a whole current image constituting a motion vector field associated to said current image;

for each current image, coding the motion information constituted by said associated motion vector field, the motion vector C to be coded for each current block being approximated by a spatio-temporal predictor P obtained by means of a linear combination defined by a relation of the type:

$$P = \alpha \cdot S + \beta \cdot T$$

where S and T are spatial and temporal predictors respectively, and ($\alpha$, $\beta$) are weighting coefficients respectively associated to said spatial and temporal predictors, said decoding method being characterized in that it comprises two types of decoding step:

for the first motion vector field of the sequence, a first type of decoding step only based on spatial predictors;

for the other motion vector fields, a second type of decoding step comprising a computation of the spatio-temporal predictor P on the basis of the motion vectors of the previous motion vector field already decoded, spatial predictors defined in the neighbourhood of the current motion vector to be decoded, and the transmitted weighting coefficients $\alpha$ and $\beta$.

* * * * *